United States Patent [19]
Wilhelm

[11] Patent Number: 5,700,500
[45] Date of Patent: Dec. 23, 1997

[54] TWO-STAGE INJECTION-MOLDING MACHINE

[75] Inventor: Henning Wilhelm, Lehrte/OT. Aligse, Germany

[73] Assignee: Polygram International Holding B.V., Baarn, Netherlands

[21] Appl. No.: 656,744

[22] Filed: Jun. 3, 1996

[30] Foreign Application Priority Data

Jun. 8, 1995 [DE] Germany ............ 195 20 931.1

[51] Int. Cl.$^6$ ........................... B29C 45/22
[52] U.S. Cl. ........... 425/572; 264/297.8; 264/328.8; 425/588; 425/810
[58] Field of Search .................. 425/572, 588, 425/810; 264/297.8, 328.8

[56] References Cited

U.S. PATENT DOCUMENTS 5,112,558  5/1992  Schad et al. ............ 425/572

FOREIGN PATENT DOCUMENTS

| | | |
|---|---|---|
| 61-121912A | 6/1986 | Japan . |
| 61-185424A | 8/1986 | Japan . |
| 62-121024A | 6/1987 | Japan . |
| 62-236717A | 10/1987 | Japan . |
| WO9003878 | 4/1990 | WIPO . |
| WO9508428 | 3/1995 | WIPO . |

*Primary Examiner*—Tim Heitbrink
*Attorney, Agent, or Firm*—Michael E. Belk

[57] ABSTRACT

The invention relates to a two-stage injection-molding machine with a fixed mold plate, a movable mold plate and a two-part intermediate assembly, arranged to be movable between said plates, and with a supply of injection-molding material for the intermediate assembly to supply the stages formed between the intermediate assembly and the mold plates with injection-molding material. In order to simplify the production of injection-molded parts of different colors in one and the same injection-molding process it is proposed, in accordance with the invention, that for each stage there has been provided a separate supply of injection-molding material via a separate main channel. In addition to the free choice of the color for each stage, it is possible to use various types of plastic per stage in one and the same injection-molding process.

4 Claims, 2 Drawing Sheets

TWO-STAGE INJECTION-MOLDING MACHINE

BACKGROUND OF THE INVENTION

The invention relates to a two-stage injection-molding machine comprising a fixed mold plate, a movable mold plate and a two-part intermediate assembly, arranged to be movable between said plates, and comprising a supply of injection-molding material for the intermediate assembly to supply the stages formed between the intermediate assembly and the mold plates with injection-molding material.

Injection-molding machines of the type defined in the opening paragraph are known. They serve, for example, for the production of plastic parts, for example, CD containers. In the known injection-molding machines the one-color plastic is fed to the two-part intermediate assembly via a central hot runner and is then fed into the cavities in the two stages via a distributor plate. By means of the cavities provided in the two stages it is therefore possible only to mold plastic parts consisting of the same material and having the same color, because the two stages have only one common distributor plate via which the material is injected simultaneously into both stages in an injection-molding process. On the other hand, it is possible to provide two different cavities in the two stages, so that for example in the case of a CD container the cover sections are formed in one stage and the bottom sections are formed in the other stage.

Until now a separate injection-molding machine for each color was needed for the production of, for example, CD containers consisting of two differently colored parts. A known multibox CD container comprises, for example, two similarly shaped cover sections with an interposed center section. For example, if such a container should have a black center section and cover sections in a light color, this would require the use of two machines. In an injection-molding process, for example, two center sections were made in a single-stage injection-molding machine and four similar cover sections were made in a two-stage injection-molding machine. After the injection-molding process the two center sections and the four cover sections were removed by grippers and conveyed to an automatic assembly unit, where they were assembled to form the container.

SUMMARY OF THE INVENTION

It is an object of the invention to improve a two-stage injection-molding machine of the type defined in the opening paragraph in such a manner that it is also possible. to mold plastic parts in two different colors and, if desired, of different materials by means of one and the same injection-molding machine in one operation.

According to the invention this object is achieved in that for each stage there has been provided a separate supply of injection-molding material via a separate main channel (hot runner). This makes it possible to manufacture plastic parts of one color from a first material in one stage and plastic parts of the other color from a different second material in the other stage in one and the same injection-molding process. The advantage resides in the fact that the different parts can now be manufactured in a single injection-molding machine. This enables the production costs entailed until now by the use of two machines to be reduced considerably. Thus, the advantage resides in the cancellation of the second injection-molding machine and of the intricate gripper arrangement required until now to remove the differently colored parts from both machines in the same rhythm and to convey them to an automatic assembly unit. The two differently colored plastic parts, which may also consist of different materials and which are now manufactured in one and the same machine, can now be gripped by a single automatic gripper in order to be conveyed to the automatic assembly unit. Moreover, this results in a substantial saving of space and a substantial reduction of the number of rejects.

In an embodiment of the invention each subassembly of the two-part intermediate assembly comprises a separate distributor plate connected to a separate main channel (hot runner) for the supply of injection-molding material to each respective stage. Thus, a distinct and reliable separation of the two different injection-molding materials for each of the two stages is obtained. This prevents the supplies of different injection-molding materials from influencing or interfering with one another.

In a further embodiment of the invention the supply of injection-molding material to the first stage adjacent the fixed mold plate is effected via a main channel disposed centrally in the fixed mould plate. In the two-stage injection-molding machines known until now the supply of the one-color injection-molding material was also effected via a central main channel in the fixed mold but until now the one-color injection-molding material was fed both into the first stage and into the second stage via the common distributor plate. In the construction in accordance with the invention the injection-molding material fed through the central main channel is fed only into the first stage. With this construction it is possible to use the known two-stage injection-molding machines having a hot runner system with a common distributor plate, but the main channels for feeding the injection-molding material into the second stage are then closed. A saving is obtained is obtained in that for the first stage it is, in principle, possible to use the customary construction with only minor modifications.

In a further embodiment of the invention the supply of injection-molding material to the second stage adjacent the movable mold plate is effected via an eccentrically disposed auxiliary channel. This auxiliary channel extends outside the fixed mold plate and the two-part intermediate assembly and opens into the subassembly comprising the distributor plate for the second stage. Thus, the first and the second subassembly of the intermediate assembly each comprise a separate distributor plate, which plates can operate independently of one another with differently colored and, if desired, different injection-molding materials.

According to the invention it is proposed that, in an injection-molding machine comprising a nozzle plate preceding the fixed mold plate and a centrally disposed main feed unit, which is connected to the associated distributor plate of the intermediate assembly via the main channel to supply the first stage with injection-molding material, the nozzle plate has been enlarged radially to receive the auxiliary feed unit for the supply of injection-molding material to the second stage, and the auxiliary feed unit is connected to the distributor plate of the intermediate assembly via the auxiliary channel, which has been divided at the location of the first stage. Such construction has the advantage that the existing nozzle plate is merely adapted to receive the auxiliary feed unit. The arrangement of the auxiliary feed unit, i.e. at the top, sideways or obliquely, follows from the specific application and is not fundamental. The connection between the auxiliary feed unit and the distributor plate for the second stage in the subassembly of the intermediate assembly is provided by the auxiliary channel, which has been divided in two parts in the first stage. After completion of the mould-closing movement the two parts of the auxiliary channel are coupled to one another, thereby guaranteeing a reliable supply of the injection-molding material.

In order to ensure that the two parts of the auxiliary channel are each time accurately coupled to one another, the two parts are fixedly connected to the exterior of the fixed mould plate and the exterior of the intermediate assembly, respectively, for example by means of screws.

DESCRIPTION OF THE PREFERRED EMBODIMENTS

Figure 1:
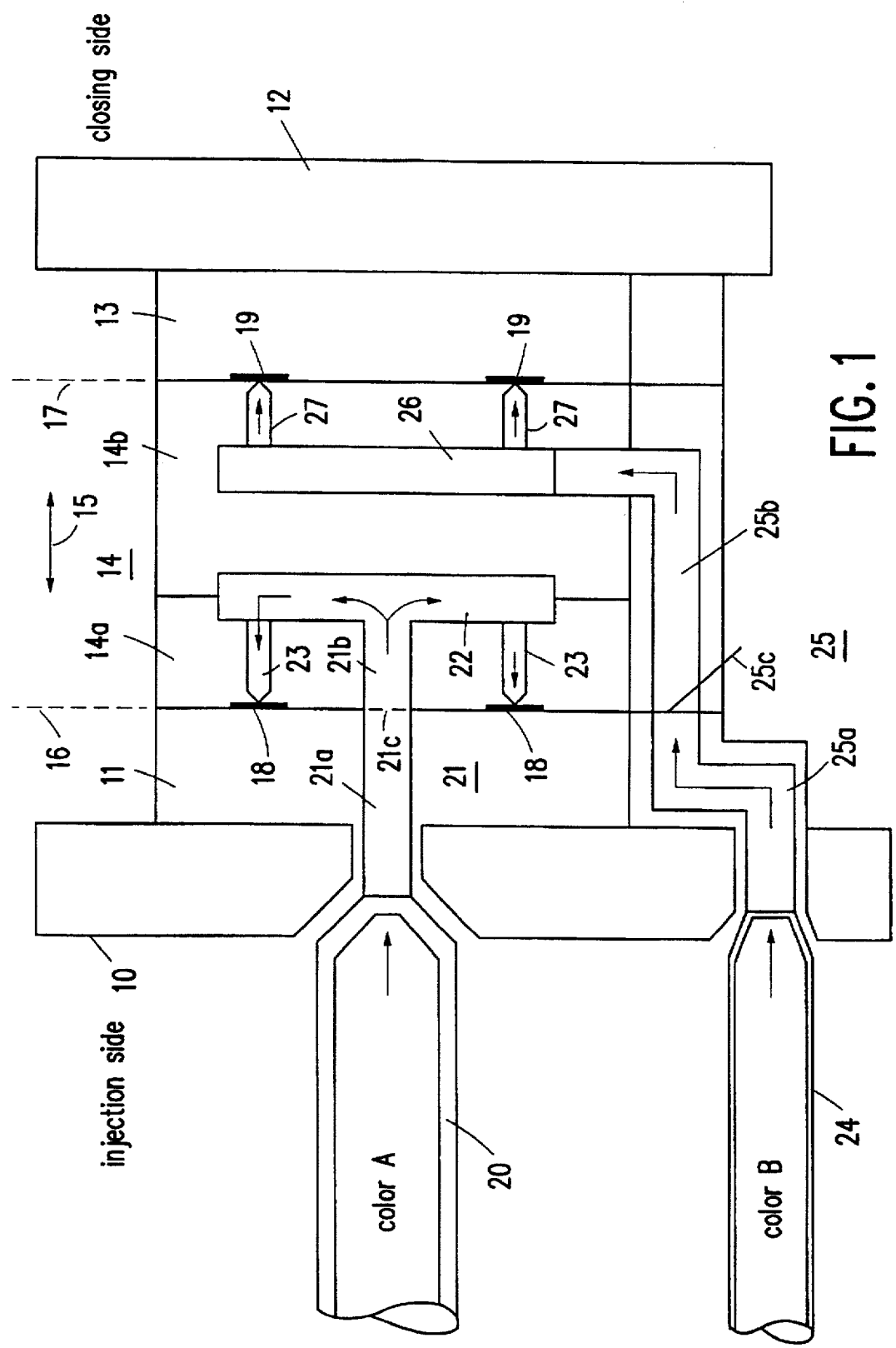
FIG. 1 shows diagrammatically an embodiment of the invention.
Figure 2:
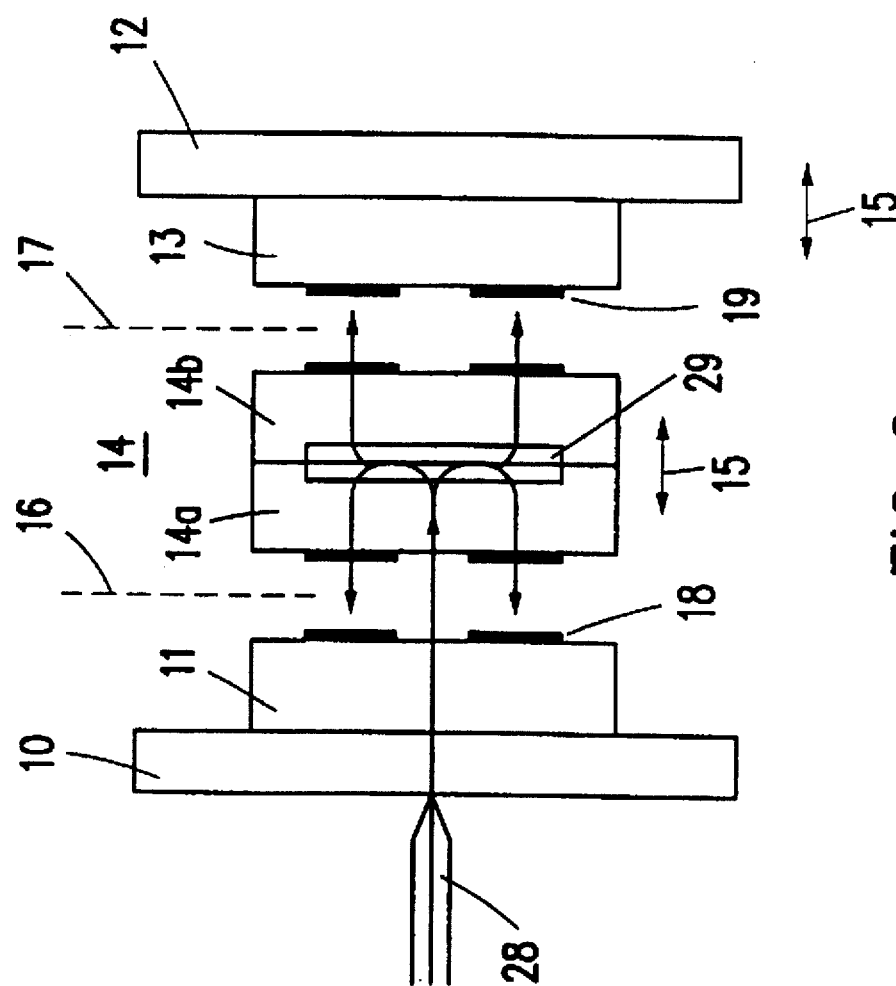
FIG. 2 is a diagrammatic representation of the prior art.

The two-stage injection-molding machine shown in FIG. 1 comprises a fixed nozzle plate 10 with a fixed mould plate 11 and a movable plate 12 with a movable mold plate 13. A movable intermediate assembly 14 comprising the two subassemblies 14a and 14b is interposed between said plates. The intermediate assembly 14 and the plate 12 with the mold plate 13 are arranged so as to be movable in a direction 15. The injection-molding machine shown in FIG. 2 is shown in a closed condition and its left-hand side is referred to as the injection side and the right-hand side as the closing side. With its first subassembly 14a and the fixed mold plate 11 the intermediate assembly 14 forms a first molding stage 16 and with its second subassembly 14b and the movable mold plate 13 it forms a second molding stage 17. In the molding stages 16 and 17 cavities 18 and 19 have been provided, which are filed with an injection-molding material during the injection-molding process. The injection-molding material of the color A is fed from a central main channel 21 to a distributor plate 22 arranged in the first subassembly 14a and is then fed to the cavities 18 via main channels 23. Independently of this, injection-molding material of the color B is fed from an eccentrically disposed auxiliary feed unit 24 to a distributor plate 26 in the other subassembly 14b of the intermediate assembly 14 and is then fed to the cavities 19 in the second stage 17 via main channels 27. The auxiliary channel comprising the parts 25a, 25b has been divided at the location 25c in the first stage 16. The same applies to the main channel 21 which has been divided into two parts 21a and 21b at the location 21c. At the instant at which the mould plates 11 and 13 engage with the intermediate assembly the parts 21a, 21b or 25a, 25b are coupled in a known manner, not shown, thereby guaranteeing a reliable supply of material to the cavities 18, 19. Before the mould plates 11, 13 are opened these main channels are closed in a manner, not shown.

In the embodiment shown in FIG. 1, for example two black center sections of a multibox are manufactured in the first stage 16 and four cover sections of a light color are manufactured in the second stage 17 in each injection-molding process. After the injection-molding process these sections are conveyed to an assembly unit, where they are assembled to form two complete multiboxes. As a result of the strict separation between the material supplies the type of plastic, for example PE (polyethylene), PP (polypropylene) or PS (polystyrene), can be chosen freely for each stage.

FIG. 2 shows a known two-stage injection-molding machine, in which like parts bear the same reference numerals. In contradistinction to the construction in accordance with the invention it comprises only one central feed unit 28 for injection-molding material, which is fed to the cavities 18 and 19 via a distributor plate 29 which is common to the two stages 16, 17. As is apparent, this construction only allows the use of an injection-molding material in one color, so that the molded parts can also be in only one color. The type of plastic is the same for both stages.

I claim:

1. A two-stage injection molding machine comprising:

a fixed mold plate;

a movable mold plate; and an intermediate assembly arranged to be movable between said mold plates and which comprises a first distributor plate adjoining the fixed mold plate and a second distributor plate adjoining the movable mold plate;

the first and second distributor plates being respectively connected to first and second supply channels which supply injection-molding material thereto for distribution from the first supply channel to the fixed mold plate and from the second supply channel to the movable mold plate.

2. An injection molding machine as claimed in claim 1, wherein the first supply channel is centrally positioned in relation to the fixed mold plate and the second supply channel is eccentrically positioned in relation to the movable mold plate.

3. An injection molding machine comprising: first and second molding stages; an intermediate assembly between said molding stages and having a first and a second distributor plate; a main supply channel connected to the first distributor plate for supplying a first injection-molding material thereto for distribution to the first molding stage; a fixed mold plate adjoining the first molding stage; and a nozzle plate preceding the fixed mold plate, the main supply channel being centrally positioned in said nozzle plate; and wherein the nozzle plate is radially extended to eccentrically accommodate an auxiliary supply channel which is connected to the second distributor plate for supplying a second injection-molding material thereto for distribution to the second molding stage, the auxiliary supply channel having a change in direction thereof at the location of the first molding stage.

4. An injection molding machine as claimed in claim 3, wherein parts of the auxiliary supply channel which are associated with said change in direction thereof are respectively detachably connected to the exterior of the fixed mold plate and to the exterior of the intermediate assembly.

* * * * *